Figure 1:
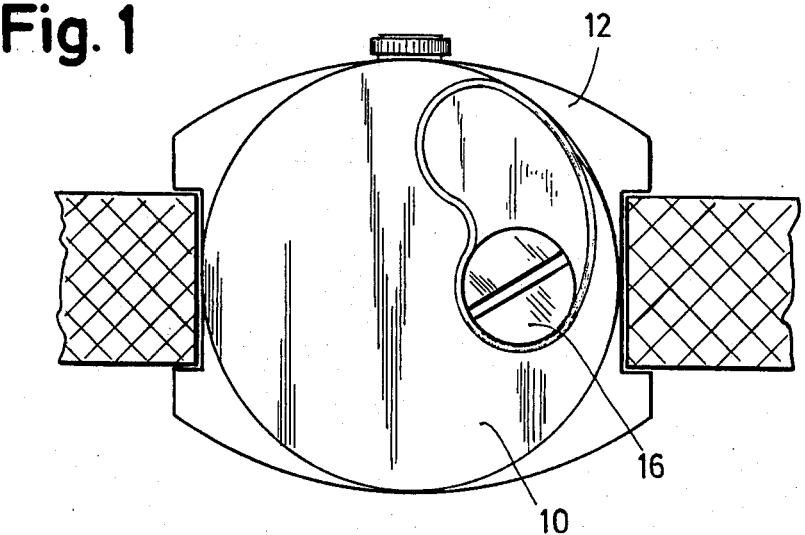

United States Patent [19]
Esselborn

[11] 3,916,613
[45] Nov. 4, 1975

[54] CONTACTING, LOCATING AND EXCHANGING MEANS FOR ENERGY CELLS IN TIMEPIECES

[75] Inventor: Fred Esselborn, Pforzheim, Germany

[73] Assignee: Timex Corporation, Waterbury, Conn.

[22] Filed: Mar. 12, 1975

[21] Appl. No.: 554,300

[30] Foreign Application Priority Data
Apr. 27, 1974 Germany............................ 2425622

[52] U.S. Cl.................. 58/23 BA; 58/53; 235/156; 354/288
[51] Int. Cl.². G04C 3/00; G04B 37/00; G06F 7/38; G03B 17/02
[58] Field of Search............ 58/23 BA, 53; 136/166; 320/3 T, 25; 224/4 R, 4 A; 235/156, 28 R, 28 M; 310/47, 50 R, 71; 354/288

[56] References Cited
UNITED STATES PATENTS

| | | | |
|---|---|---|---|
| 3,683,613 | 8/1972 | Baumgartner et al............ | 58/23 BA |
| 3,729,923 | 5/1973 | Brigliano et al..................... | 58/50 R |
| 3,759,031 | 9/1973 | McCullough et al. .............. | 50/50 R |
| 3,846,971 | 11/1974 | Ho et al. ............................ | 58/23 R |

*Primary Examiner*—Edith Simmons Jackmon

[57] ABSTRACT

An electric wristwatch having provision for inserting and holding more than one battery through a single opening, by means of a pivotable battery holder which also serves to make electrical connections inside the watchcase.

10 Claims, 6 Drawing Figures

CONTACTING, LOCATING AND EXCHANGING MEANS FOR ENERGY CELLS IN TIMEPIECES

BACKGROUND OF THE INVENTION

The invention concerns a battery-driven small electric device, especially an electric wristwatch, with a case to receive the battery, which has an opening in a case wall, preferably in the case back, which is proportioned to the size of a battery, particularly a button cell.

The invention is described in the following by way of an electric wristwatch, however, it can, by achieving considerable advantages, also be applied to other small electric devices, for instance to small electric measuring devices, photo- and film apparatus, pocket calculator and such, that is, all small devices which for certain operating purposes require more than one battery.

Electric wristwatches, whose movement is driven by a button cell, have at the case back an eccentrically arranged round opening with a diameter slightly larger than that of a button cell, and which can be locked dust- and waterproof by a screw cover or a cover with bayonet catch. The frame of the movement, together with the outside ring of the watchcase, form under the opening a battery receptacle, below which, in insulated mounting, a contact tab is arranged for the one pole of the button cell. A second contact tab or contact spring rests against the case of the button cell, which forms the second pole.

Quite recently the electric wristwatches have also been equipped with an acoustic signal source. Since the battery for the movement is required to operate the movement for at least one year, and since, due to their extensive height, larger batteries cannot be accommodated in a wristwatch due to limited space, it is appropriate to operate the acoustic signal source by means of a second button cell. The second cell is also relatively small, but due to the small overall height of the wristwatch two button cells cannot be accommodated above each other in the watchcase. Furthermore, the use of two batteries would usually require two openings in the case back, for the insertion and exchange of the two batteries, but this is undesirable for various reasons. In the first place, the covers for locking such openings protrude. In the second place, it is the aim to make the watchcase dust- and waterproof and to use as few openings as possible. Finally, the appearance of the watch would be considerable impaired by two openings and two covers.

SUMMARY OF THE INVENTION

It is the object of the invention to construct a device of the type described in the aforegoing in such a way, that it can accommodate more than one battery without the previously mentioned disadvantages appearing.

In accordance with the present invention, this task is solved by the fact that the case has space to receive several batteries, arranged next to each other, but only one opening, and that a device is provided for shifting at least one of the batteries from a position of this battery not below the opening to a position below the opening, so that the batteries can, one after the other, be moved below the opening.

In the preferred embodiment, one single opening with a diameter slightly larger than the diameter of a battery — with batteries of variable diameter slightly larger than the diameter of the largest battery — will be sufficient, so that the case constructed according to the invention does not differ externally from such cases which have to accommodate only one battery. Apart from avoiding the disadvantages mentioned in the aforesaid, this construction will also prevent additional costs for the manufacture of several water- and dust-proof sealable openings.

As such, the device for shifting at least one of the batteries can be constructed in the most varied way; it is feasible, for instance, to form a loop with a flexible band, which will receive the battery, whereat the free end of this band will terminate in the case opening, so that by pulling the free end of the band a battery can be brought under the opening. It would, however, be more practical with devices having a battery-holder in the case for accommodating at least one battery, to construct the battery-holder in a flexible way, so that same will form the device for shifting at least one of the batteries. The easiest way to achieve movability of the battery-holder is by swivelling construction of the latter. This method has the advantage that the linking point for the battery-holder can be placed at any point in the device case, just where space for such a link is available.

As such, two batteries can be arranged directly next to each other, whereby the battery cases forming the plus pole are touching. Since this method does not guarantee low contact resistances at the points of contact, a preferred type of construction of the invention has the battery-holder contact devices for at least two batteries arranged next to each other, namely especially for the battery which is received by the flexible battery-holder and a second battery arranged beside the battery-holder. Depending on whether the battery-holder consists of electric-conducting material or insulating material, as for instance synthetic material, the batteries can be connected either in parallel or in series with each other.

If a flat method of construction is desired, it is particularly suitable when the battery-holder is formed as a plate possessing contact tabs as contact devices. The easiest way of providing the contact tabs is by bending the tabs from the plate-level. Such contact tabs allow the battery, which is received by the battery-holder, also to be held at a certain level, namely when at least one of the contact tabs surrounds the profile one of the batteries. It is particularly recommended to provide the plate forming the battery-holder with at least one hole for inserting a battery.

In order not to have to make a ground connection via the pivot link of the battery-holder, it is recommended to provide the battery-holder with a contact device for establishing an electric conducting ground connection to the case body, whereat this contact device is specially formed as a contact tab lying against a front frame, whereby in a simple way high contact pressures and thereby low contact resistances are achieved.

In order to avoid a short-circuit between the central pole and case body when shifting the one battery, it is finally recommended that with a device where the plate or front frame facing this pole (usually minus-pole) of the one button-cell has a recess for this central pole to give an elongated shape to the recess for the central pole of the button cell, which can be shifted under the opening, so that same will extend over the whole of the movement path of this pole. The recess rims can thereby support the case-rim of the button cell, so that the rim is guided during shifting at the same level.

DRAWING

Figure 2:
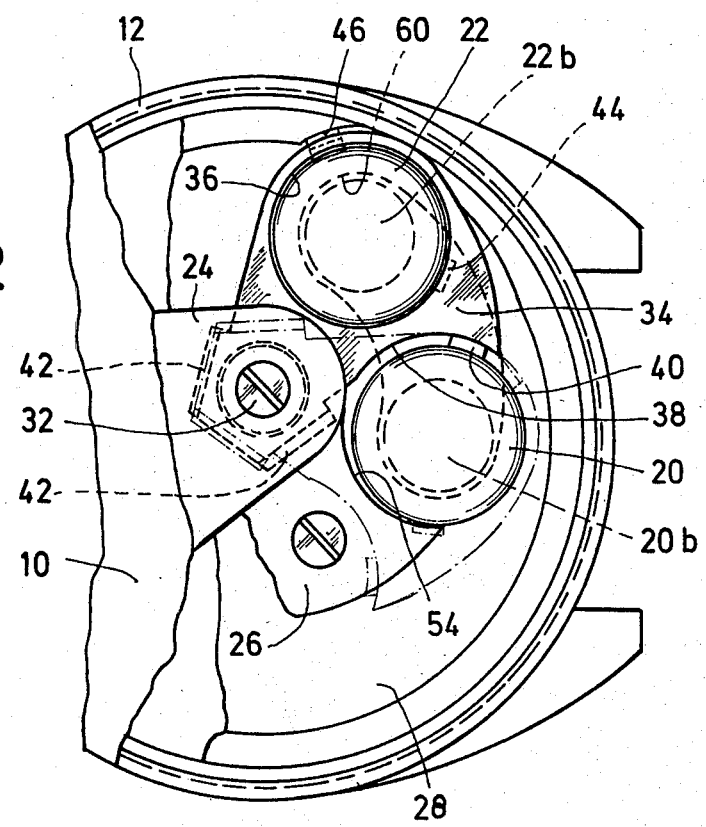
Figure 3:
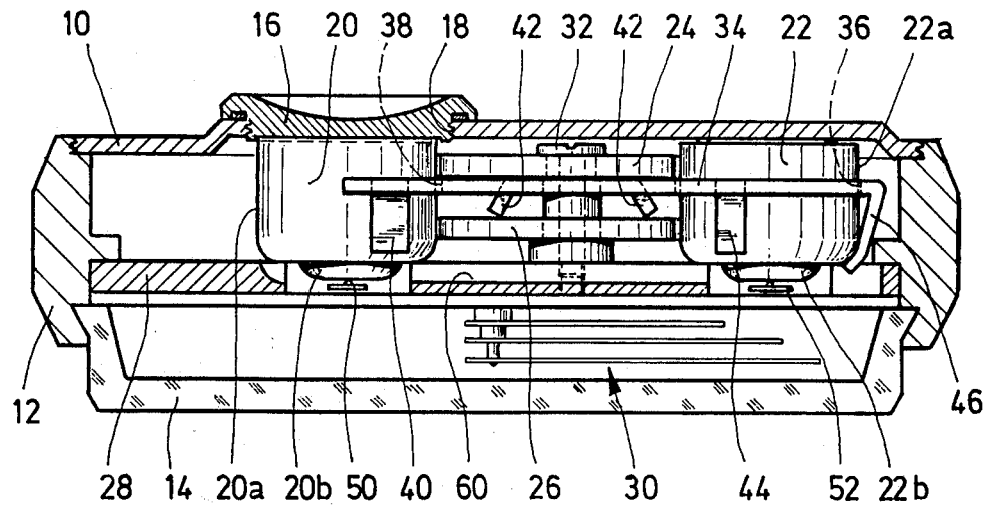
Figure 4A:
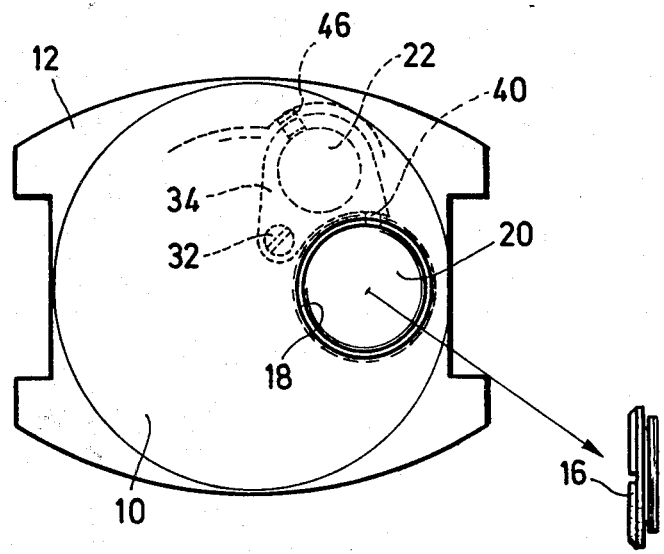
Figure 4B:
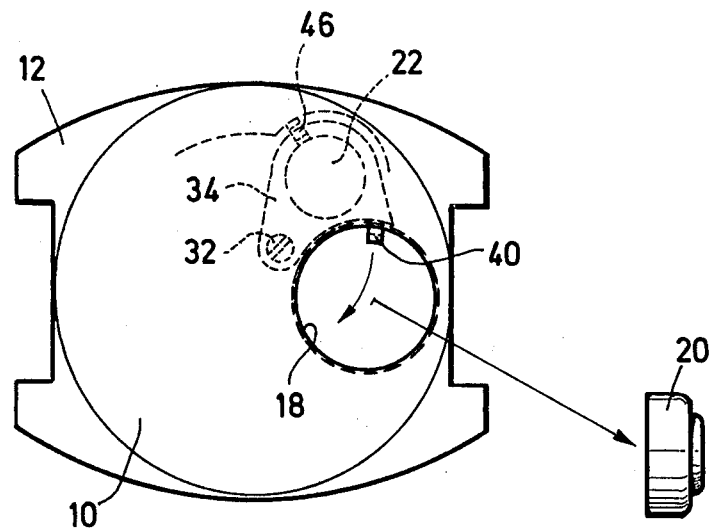
Figure 4C:
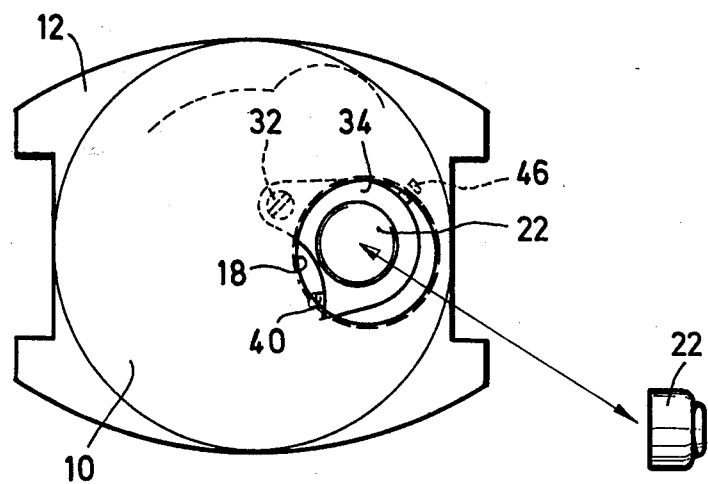

Further characteristics and details follow from the attached patent claims and/or from the following description and the attached drawing of a preferred type of construction of a wristwatch constructed according to the invention; in which:

FIG. 1 a view of the watch from the back;

FIG. 2 a schematic representation of the battery-holder viewing the watch from the back after a part of the case back has been removed, FIG. 3 a section through the watch, whereby only those parts are illustrated, which are substantial to the invention, and FIGS. 4a through 4c are illustrations similar to FIG. 1 which indicate the sequence of steps of changing the battery.

FIG. 1 shows the top-view on the back 10 of the case of an electric wristwatch, which is completed by a case top 12 and the watch crystal 14. In the case back is an opening 18, which can be locked by a screw cover 16, through which two button cells 20 and 22 can be inserted or removed from the watch. FIG. 3 shows also three front frames 24, 26 and 28 of a movement frame as well as the hands 30 of the watch.

Hinged to the front frames at 32 is a swivelling battery-receiver 34 which consists of a piece of sheet metal which has a hole 36 to receive the button cell 22 as well as a recess 38 proportioned to the radius of the button cell 20. Apart from this, the battery-receiver has five contact tabs 40, 42, 44, 46 in the form of stamped tongues, bent downwards, of which two, namely the contact tabs 42, rest against the front frame 26, while the contact tab 40 rests against the case 20a of button cell 20, this case forming the plus pole, and the contact tabs 44 and 46 rest against the case 22a of the button cell 22.

According to the invention the contact tab 46 has three functions, namely to make an electric conducting connection between the case top 12 and the one pole (22a) of the one button cell, further to connect electrically conducting the case top 12 with the movement frame 24, 26, 28 and finally to limit the swivel motion of the battery receiver 34.

The contact tab 46 is, furthermore, shaped of a length and bent in such a way that it grips the profile of the case 22a of the button cell 22 and so keeps the latter against the case back 10. The same can apply to the contact tab 40 in respect of the button cell 20 and the cover 16. Arranged to the minus poles 20b and 22b of the button cells are contact tabs 50 and 52, which are fixed electrically insulating at or between the front frames 24, 26, 28 in a way not further described. Finally, the front frames have recesses 54 adapated to the radius of the button cell 20, these recesses, together with the recess 38, appropriately receive the button cell 20, when the battery receiver 34 takes up its position illustrated in FIG. 2 by solid lines.

OPERATION

If the button cells 20 and 22 are to be exchanged, then first of all the cover 16 is taken off (see FIG. 4a), after which the button cell 20 can be removed from the watchcase (FIG. 4b). Now the battery receiver 34 can be swivelled out clockwise per FIGS. 2 and 4, until the button cell 22 lies under the opening 18 and can also be removed from the watch (FIG. 4c). Swivelling the battery receiver around its pivot point 32 can be done with any suitable tool, with which one for instance grips the contact tab 40. It is also imaginable, however, that the swivelling of the battery receiver can take place under the effect of a spring (not shown). The end position of the battery receiver, shown in dotted lines in FIG. 2, in which the button cell 22 can be exchanged, is in the preferred type of construction of the invention, defined by the fact that the contact tab 44 rests against the rim of the recesses 54 of the front frames. After insertion of a new button cell 22 the battery receiver 34 is swivelled back until the contact tab 46 lies against the case top 12, whereupon a new button cell 20 can be inserted and then the opening 18 can be closed again by the cover 16.

It can be perceived from FIGS. 4a – 4c that button cells of differing sizes can also be used.

In order to prevent a short circuit to the minus pole 22b of the button cell 22 while the battery receiver 34 is swivelled under the opening 18, an elongated path 60 is nilled in the front frame 28, which corresponds to the path of movement of the minus pole 22b and is shown in broken lines in FIG. 2. The rim of this nilled recess can support the round shoulder of the button cell cases.

When various button cells are used, then it could be practicable to provide the battery receiver with markings as to which of the button cells is to be arranged in hole 36 and which between the recesses 38 and 54.

It is also worthwhile mentioning that the battery receiver 34 forms the ground contact tabs for both button cells, so that no special parts need to be assembled.

It is understood that a swivel of movable battery receiver can be positioned at the case instead of at the work frame formed by the front frames, and under certain circumstances it is of advantage to provide the battery receiver with pot-shaped troughs which will receive the button cells, so that in the event of leaking of the batteries, no damage can be done to the movement of the watch.

From the illustrated type of construction of the invention the main characteristics can clearly be seen. One single element simultaneously takes over the task of making contact to the batteries, positioning these in the case, and serving as changing-device for at least one of the batteries.

I claim:

1. In a battery-driven small electric device, especially an electric wristwatch, of the type having a case with a wall, the improvement comprising:
   a space defined within said case adpated to receive a plurality of batteries,
   an opening above said space defined in the case wall proportioned to receive only one of said batteries at a time, and
   means for moving at least one of said batteries from a position within said space in which this battery is not below said opening to a position below said opening, so that the batteries can be brought below the opening one after another.

2. The improvement according to claim 1, wherein said moving means comprises a battery holder arranged in the case to receive at least one battery, said battery holder being movable and forming the device for moving at least one of the batteries.

3. The improvement according to claim 1, wherein said battery holder can be swivelled.

4. The improvement according to claim 2, wherein the battery holder has contact devices for at least two batteries arranged next to each other.

5. The improvement according to claim 2, wherein battery holder is formed as a plate which has contact tabs as contact devices.

6. The improvement according to claim 5 wherein at least one of said contact tabs grips the profile of at least one of the batteries.

7. The improvement according to claim 2, wherein the plate has at least one hole for insertion of a battery.

8. The improvement according to claim 2, wherein the battery holder has a ground contact tab for making an electrically conducting ground connection to the case.

9. The improvement according to claim 2 and adapted for two batteries, wherein the battery holder is adjustable between two positions, in one of which a first battery received by the battery holder, lies below said opening and in the other of which the battery holder forms a stop for a second battery then lying below the opening.

10. The improvement according to claim 1 and adapted for button cells, wherein a plate or front frame, facing the minus pole of the one button cell, and made of electric conducting material has a recess for this minus pole, said recess being of elongated shape and extending over the whole of the movement path of this pole.

* * * * *